United States Patent [19]

Aoki et al.

[11] Patent Number: 5,284,381
[45] Date of Patent: Feb. 8, 1994

[54] STRUCTURE OF SEAT CUSHION FRAME IN AUTOMOTIVE SEAT

[75] Inventors: Akira Aoki; Yoshihiro Mizushima, both of Akishima, Japan

[73] Assignee: Tachi-S Co. Ltd., Akishima, Japan

[21] Appl. No.: 794,431

[22] Filed: Nov. 19, 1991

[51] Int. Cl.⁵ .................................................. A47C 7/02
[52] U.S. Cl. ........................... 297/452.18; 297/452.1
[58] Field of Search ............... 297/452, 218, 455, 458, 297/459, 460

[56] References Cited

U.S. PATENT DOCUMENTS

| | | | |
|---|---|---|---|
| 3,241,879 | 3/1966 | Castello et al. | 297/460 |
| 3,498,669 | 3/1970 | Tabor | 297/459 X |
| 3,981,534 | 9/1976 | Wilton | 297/218 X |
| 4,165,126 | 8/1979 | Strien et al. | 297/458 X |
| 4,969,687 | 11/1990 | Higuchi et al. | 297/452 |
| 5,092,654 | 3/1992 | Inaba et al. | 297/460 X |

FOREIGN PATENT DOCUMENTS

| | | | |
|---|---|---|---|
| 691679 | 11/1961 | Canada | 297/460 |
| 3633011 | 4/1987 | Fed. Rep. of Germany | 297/452 |

*Primary Examiner*—Laurie K. Cranmer
*Attorney, Agent, or Firm*—Oldham, Oldham & Wilson Co.

[57] ABSTRACT

A seat cushion frame structure in an automotive seat, wherein the seat cushion frame is formed with forward and backward frame sections, and a U-shaped main frame section disposed between the two frame sections, such that the main frame section may be desirably positioned and welded at its both forward ends to the forward frame section, thereby permitting variation of length of seat cushion frame.

5 Claims, 2 Drawing Sheets

STRUCTURE OF SEAT CUSHION FRAME IN AUTOMOTIVE SEAT

BACKGROUND OF THE INVENTION

1. Field of the Invention

The present invention relates to a structure of a seat cushion frame in an automotive seat, and is particularly directed to that kind of structure wherein the seat cushion frame is variable its length in the fore-and-aft direction of the seat, without requiring replacement of the frame per se by another one.

2. Description of Prior Art

In the past, an ordinary seat cushion frame, which is provided within a seat cushion of an automotive seat, has been formed by bending a tubular material into an rectangular shape, with a sinuous springs being extended between both lateral bar sections of the frame, or by subjecting a metallic plate to a press working process so as to obtain a desired pan-type frame. Since this sort of frame can never be varied its length in the fore-and-aft direction of the seat, and to create different of seat cushion frames with different fore-and-aft lengths, there has been a need to form individual frames to meet such different length geometries, resulting in troublesome labor for preparing different frames for corresponding different seat cushion frames.

As a possible solution to this problem, such a frame structure is proposed, that comprises a forward frame, a rearward frame and a pair of lateral side frames, such that all the frames are provided separately, and the forward and rearward frame are of the same frame material with the same dimensions for permitting a common use of them. According thereto, varying the length of both lateral side frames may meet the foregoing demand for producing seat cushion frames with different fore-and-aft lengths. However, this particular structure is found defective in requiring extraordinary steps of assemblage and mandate involved.

SUMMARY OF THE INVENTION

In view of the above-stated drawbacks, it is therefore a purpose of the present invention to provide an improved structure of seat cushion frame which allows for making variable the length of seat cushion frame, without any replacement of associated frame sections.

In order to accomplish such purpose, according to the present invention, the seat cushion frame structure comprises a forward frame section, backward frame section and a generally U-shaped main frame section, with such an arrangment that two free ends of the main frame section are to be variably positioned at the forward frame section for welding thereto, and the backward horizonatal part of the main frame section is welded to the backward frame section.

Accordingly, the length of main frame section may be varied and welded to the forward frame section, which permits production of different seat cushion frames with different fore-and-aft lengths thereof, without any modification and replacement of those all frame sections.

Further, on such invariable frame sections, there may be defined securing portions, spring securing points, or cover member anchoring portions, for common collective use purposes.

DETAILED DESCRIPTION OF PREFERRED EMBODIMENT OF THE INVENTION

Figure 1:
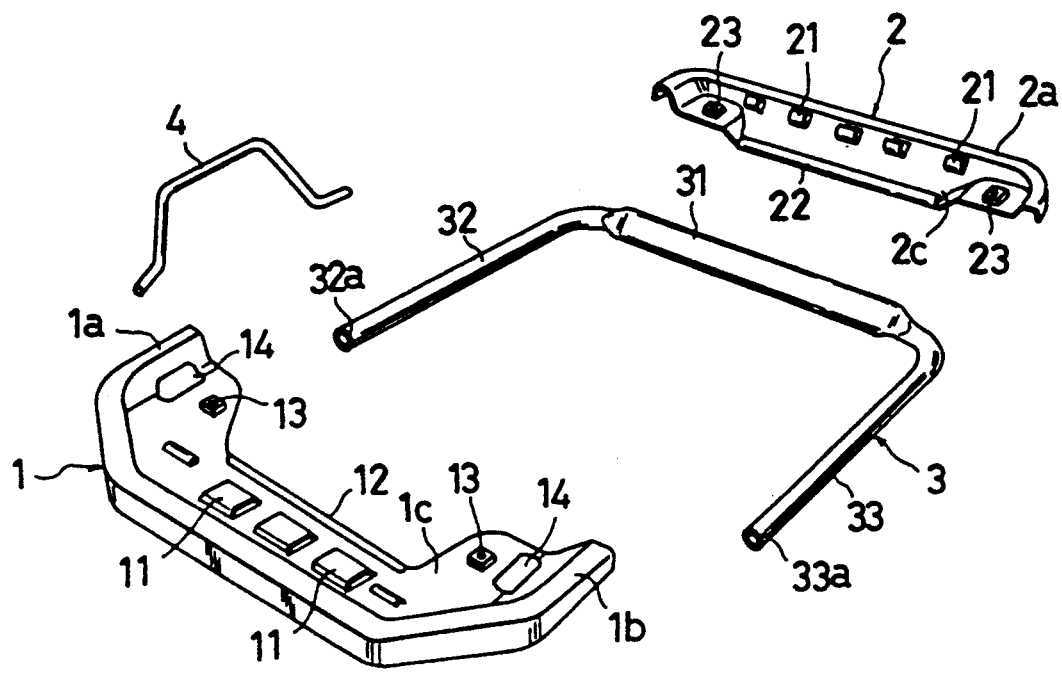
FIG. 1 an exploded, persepctive view of a seat cushion frame in accordance with the present invention.

Referring to FIG. 1 there is generally shown a structure, in an exploded state, of seat cushion frame for a seat cushion of an automotive seat in accordance with the present invention. The seat cushion frame per se is basically comprised of a forward frame member (1), a rearward frame member (2), and a main frame member (3).

Figure 4:
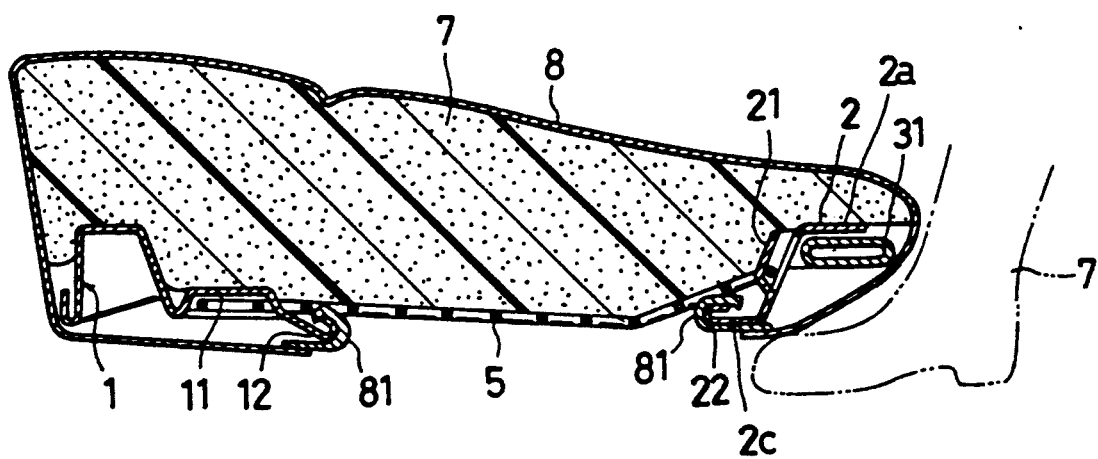
FIG. 4 is a sectional view similar to FIG. 3, showing the state of the upholstered seat back frame being used.

The forward frame member (1) is formed from a metallic plate by a press working process into a configuration illustrated, in which a raised peripheral portion (as can be seen from destignations (1a)(1b) in FIG. 1 and from FIG. 4 as well) and a lowered flat portion (1c) are defined in an integral manner. The raised peripheral portion includes a pair of lateral side sections (1a)(1b) each having a channel shape in section and functioning as a part for supportively receiving therein the respective free ends (32a)(33a) of main frame member (3). In the lowered flat portion (1c), there are formed a plurality of spring securing portions (11), a pair of through-holes (14)(14), and a hook section (12). As shown, the through-holes (14) are defined at the lateral side sections (1a)(1b), respectively, such that each of the through-holes (14)(14) extends partly in the inner standing wall of lateral side section (1a or 1b) while extending partly in the lowered flat portion (1c). The through-holes (14) are intended for allowing a welding torch (not shown) to be inserted therethrough for welding the free ends (32a)(33a) of main frame member (3) to the respective lateral side sections (1a)(1b) of forward frame member (1).

Designation (13) denote a securing nut portion which are used for securing a slide rail to the bottom side of forward frame member (3), although not shown.

Figure 3:
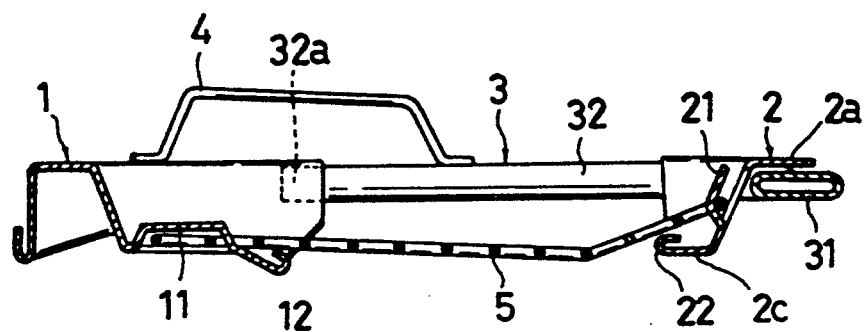
FIG. 3 is a sectional view taken along the line III—III in the FIG. 2.

The rearward frame member (2) is also formed from a metallic plate by a press working process into the illustrated configuration in which there are defined a raised peripheral portion (2a) having a horizontal rear flange part, and a lowered flat portion (2c) terminating in a generally horizontally extending hook section (22) for anchoring the terminal ends (81) of covering member (8), as best seen in FIGS. 3 and 4. At the generally vertical wall of rearward frame member (2), a plurality of spring securing portions (21) are formed, with a pair of securing nut portions (23) for securing a slide rail to the bottom side of rearward frame member (2) as likewise in the foregoing ones (13).

The main frame member (3) is formed by bending a tubular material into the Unshaped configuration, comprising a pair of lateral frame sections (32)(33) and a horizontal frame section (31) defined between the two lateral frame sections (32)(33), wherein the horizontal frame section (31) is formed falt.

Figure 2:
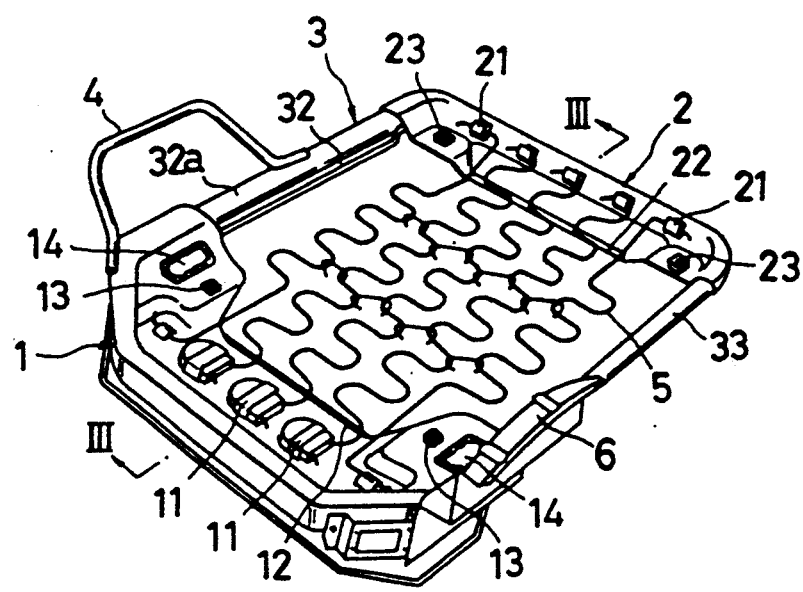
FIG. 2 is a perspective view of the seat cushion frame which has been assembled.

The free ends (32a)(33a) of the lateral frame sections (32)(33) are welded fast in the respective lateral side sections (1a)(1b) of raised peripheral portions of forward frame member (1), by use of a suitable welding torch within the through-hole (14), as shown in FIGS. 2 and 3.

On the other hand, the flat frame section (31) of main frame member (3) is welded to the horizontal rear flange part of rearward frame member (2), as best seen in FIG. 3.

As a result, a resultant seat cushion frame is obtained as shown in FIG. 2. Designations (4) and (6) stand for a wire side frame (4) and a plate side frame (6), respectively, which are to be embedded with the respective left-side and right-side bolster portion of cushion member (7) (see FIG. 4), although not shown. Designation (5) generally refers to plural sinuous springs whose respective one ends are secured in the securing portions (11) and whose respective another ends are secured in the second securing portions (21), whereupon the springs (5) are extended within the foregoing three frames (1)(2) and (3).

FIG. 4 shows the state where a foam cushion member (7) is mounted upon the above-constructed seat cushion frame and a top covering member (8) is stretched over the cushion member (7) such as to cover the upper side of the frame. Namely, the top covering member (8) is provided at its terminal ends with hook-like retainers (81), which are anchored over the hook sections (12)(22) respectively of the forward and rearward frame members (1)(2). Thus, a seat cushion is produced, wherein as indicated by the phantom line (72), the flat rear flange part (2a) is raised up from the lower flat portion (2c), which provides a rear side allowing a foot of an occupant sitting on a rear seat to extend into below the rear end side of the seat cushion.

Accordingly, in accordance with the present, it is to be appreciated that the two lateral frame sections (32)(33) of main frame member (3) may be welded at any desired welding point to the forward frame member (1), thereby allowing selective variation of the fore-and-aft length of main frame member (3) between the forward and rearward frame members (1)(2), which therefore enables formation of different seat cushion frames with different fore-and-aft lengths. This also permits the forward and rearward frame members (1)(2) to be used without any replacement thereof by another different ones. Further, since those two frame members (1)(2) are of such flat configuration in which such spring securing portions (11) (21) and securing hook portions (12)(22) can be formed, and the cushion member (7) is settled firmly within the frame members against movement. It is also appreciated that the flat section (31) of main frame member (3) is welded to the rearward frame member (2) and thus such construction makes more rigid the seat cushion frame per se.

The present invention is not limited to the illustrated embodiment, but any other modifications, replacements and additions may structurally be possible without departing from the scopes and spirits of appended claims.

What is claimed is:

1. A structure of a seat cushion bottom frame in an automotive seat, comprising:
   a forward frame member made of a metallic plate;
   a rearward frame member made of a metallic plate;
   a generally U-shaped main frame member made of a tubular material, said main frame being so interposed between said forward and rearward frame members that said forward and rearward frame members are connected together by said main frame member, said main frame member having a pair of lateral vertical frame sections and a horizontal frame section defined intermediate said pair of lateral frame sections; and
   said forward frame member having a pair of lateral side portions, each of which is provided with a means for receiving respective free ends of said pair of lateral vertical frame sections and further provided with an opening which makes it accessible to said free ends of said two lateral vertical frame sections of said pair of lateral side portions of said forward frame member, wherein said opening is disposed at a position corresponding to said means for receiving respective free ends of said two lateral vertical frame sections of said main frame member, and further wherein said horizontal frame section of said main frame member is formed flat, and wherein said rearward frame member is formed with a rear horizontal flange part to which thus-formed flat section of said main frame member is welded.

2. The structure as defined in claim 1, wherein said forward and rearward frame members are each formed with a hook-like engagement means to which a terminal end of a covering member is anchored.

3. A structure of a seat cushion bottom frame in an automotive seat, comprising:
   a forward frame member made of a metallic plate;
   a rearward frame member made of a metallic plate;
   a generally U-shaped main frame member made of a tubular material, said main frame being so interposed between said forward and rearward frame members that said forward and rearward frame members are connected together by said main frame member, said main frame member having a pair of lateral vertical frame sections and a horizontal frame section defined intermediate said pair of lateral frame sections; and
   said forward frame member having a pair of lateral side portions, each of which is provided with a means for receiving respective free ends of said pair of lateral vertical frame sections and further provided with an opening which makes it accessible to said free ends of said two lateral vertical frame sections of said pair of lateral side portions of said forward frame member, wherein said opening is disposed at a position corresponding to said means for receiving respective free ends of said two lateral vertical frame sections of said main frame member, wherein a first spring securing hook portion is formed in said forward frame member, and a second spring securing hook portion is formed in said rearward frame member, and wherein a spring means is extended between said forward and rearward frame members by securing one end of said spring means to said first spring securing hook portion of said forward frame member and securing hook portion of said rearward frame member.

4. The structure as defined in claim 3, wherein said forward and rearward frame members are each formed such as to have a raised peripheral portion and a lowered flat portion, and wherein said first and second spring securing hook portions are defined at the respective lowered flat portions of said forward and rearward frame members.

5. The structure as defined in claim 3, wherein said means for receiving respective free ends of said pair of lateral vertical frame sections comprises a channel section defined in each of said lateral side portions of said forward frame member, and wherein said opening comprises a through-hole formed in said channel section associated with said forward frame member, whereby said free ends of said main frame member are inserted into said channel sections, respectively, and welded thereto by inserting a welding torch through said through-hole.

* * * * *